Dec. 15, 1942.   J. H. H. TIRYAKIAN   2,304,967
HOOK
Filed Jan. 17, 1941
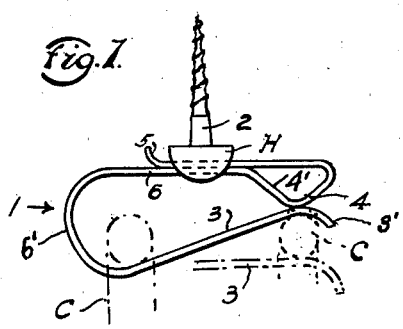
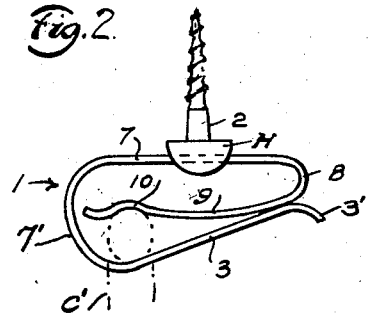
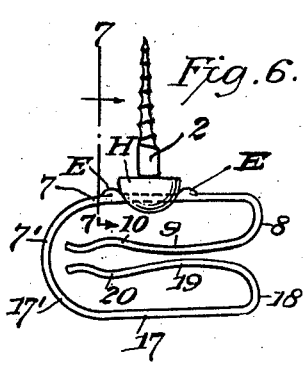
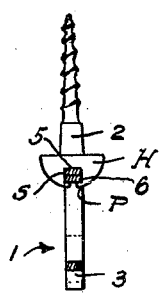
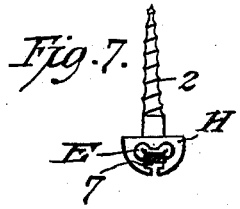
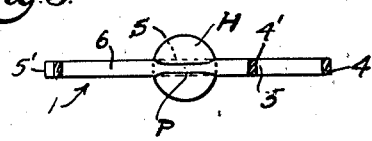
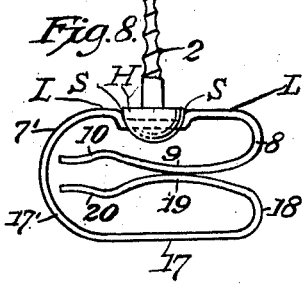
INVENTOR:
John H. H. Tiryakian,
BY
Harold D. Penney, ATTORNEY Patented Dec. 15, 1942

2,304,967

UNITED STATES PATENT OFFICE 2,304,967

HOOK

John H. H. Tiryakian, Mount Vernon, N. Y.

Application January 17, 1941, Serial No. 374,888

4 Claims. (Cl. 248—304)

The present invention relates to an improvement in guard hooks of the screw type and has for its particular advantage a construction of simple type, having only two parts in its make up.

The present hook, while adapted to many other uses, is more specifically adapted for use on the underside of cupboard shelves, for holding cups suspended by their handles therefrom, to guard against inadvertent displacement and consequent breakage, and is a variant over the hooks shown in my United States Patents #1,999,218 issued April 30, 1935, and #2,086,928, issued July 13, 1937.

The present construction involves the use of a threaded screw having a slotted head, the slot of which is utilized to operatively and firmly hold thereto a resilient hook, of spring wire, by a swaged connection, said hook being used, like a wing nut, to manually screw the hook into operative position.

The hook is preferably made of a convoluted, flat spring wire, though wire of other cross sections may also be used.

One of the features of advantage, amongst others, is in the construction of the holding portion of the hook, whereby, when it is located in cup holding position, the cup suspending portion of the hook is in angularly located position, so that the cup, when suspended by its handle tends to freely and gravitationally slide to a comparatively remote position from the entrant portion of the hook, at the rear or guard stop portion thereof.

A further feature of advantage lies in the hook construction, wherein the component convoluted portions are all in a single, axial plane and comprise rigid and resilient portions, later to be described in detail.

The foregoing and other features of advantage will be noted as the herein description proceeds, and it will be noted that modifications may be made in the construction of the hook without departing from the spirit hereof or the scope of the appended claims.

In the drawing,

Fig. 1 is a view of the hook in elevation, showing it in invert, cup holding position;

Fig. 2 is a view similar to Fig. 1, showing a modification;

Fig. 3 is a view similar to Figs. 1 and 2, showing a further slightly modified hook;

Fig. 4 is a sectional view, taken on the line 4—4, Fig. 3, looking in the direction of the arrows;

Fig. 5 is a bottom sectional view of Fig. 3, taken on the line 5—5, looking in the direction of the arrows;

Fig. 6 is a view similar to Fig. 1, showing a modification;

Fig. 7 is a sectional view, taken on the line 7—7 looking in the direction of the arrows; and Fig. 8 is a view similar to Fig. 1 showing another modification.

As shown in Figs. 1 to 8, inclusive, the assembled hook comprises, preferably, a wood screw having a threaded shank 2 and a so-called button head H, the latter being slotted at S in the usual manner.

As disclosed in Fig. 4, specifically, the slot S is utilized to seat fulcrum portions 5—6 and 7 of the hook, generally denoted by 1, said fulcrum portions in either the overlapped portions 5—6, of Figs. 1, 3 and 4, or the single portion 7, as shown in Figs. 2, 6, 7 and 8.

After the fulcrum portions of the hook have been located in desired position in the slot S, the outer edges of the slot are swaged over the slot embraced fulcrum sections, as shown in Figs. 4 and 5 at P.

The hook 1, as shown in Figs. 1, 2, 3, 6 and 8, is so bent as to form a preferably straight, dual, fulcrum portion, 5—6, Figs. 1 and 3, or a single, straight fulcrum portion 7, Figs. 2, 6 and 8.

As in Fig. 1 the fulcrum portions 5 and 6 are bent to form an upturned end to prevent the hook from being pulled out of the head H and an entrance or cam forming angle portion 4, and the portion 4 is then bent towards the slot forming an angled cam portion 4', which is bent as at 6, to be parallel to the upper fulcrum portion 5 and to thereby act also as a fulcrum member and to reinforce said portion 5, and is located in said screw slot S. Fulcrum forming portion 6 is then bent in an enlarged curve 6' in single thickness of the wire and is then bent upwardly to form an upward, angularly disposed, straight resilient cup holding arm 3, and at its outer extremity, arm 3 is bent into a short downward curve 3' to thus form, with the rigid portion 4 a cup handle entrant portion, the resilient arm 3—3' being cammed open by the cup handle C, as shown dotted.

After the cup handle C has been entered into the hook, due to the angular, downward slope of arm 3, when attached to a shelf, as viewed in Fig. 1, the cup automatically slides to the position of rest, C', as shown in Fig. 1, and there rests until it is removed from the hook.

The hook of Figs. 3 and 4 is similar to the hook shown in and described for Fig. 1, and the same description and indices apply. The only difference in Fig. 3 over Fig. 1 is in extending fulcrum portion 5 in a curve 5' over the curved portion 6' of fulcrum arm 6, and forming crimps E' to engage the head H this being done to reinforce the wing-nut like structure of the fulcrum portions above the resilient curve 6', leaving the arm 3—3' independently resilient but reinforcing the fulcrum portions for meeting the forces of manually screwing the hook into position on a shelf, or other location, by its hook portion 1 as well as to reinforce the spring action curved portion 6', and to prevent slippage of the hook in the head slot.

The modification shown in Fig. 2 comprises the slotted head screw 2—H, in the slot of which is laid the straight, fulcrum forming portion 7, which is curved at one end thereof into a resilient round end 8, this end being then bent in an elongated curved and resilient article embracing arm 9 into the interior of the hook, said arm terminating in an oppositely curved terminal or seat 10, to act to embrace an article C', shown dotted, between said curved seat portion 10, and the lower resilient arm 3—3'. Arm 3—3' is developed by a resilient curve 7' from fulcrum portion 7.

As shown in Fig. 2, the hook 1, if attached to the bottom of a shelf, may support cups by their handles C, as described for Fig. 1, or, if mounted on a vertical surface, in a horizontal position of the hook, such articles as pencils, pens and tools, etc. may be vertically mounted and supported therein, the spring grip afforded by the added resilient arm 9—10 developing a positive grip on such articles. Such articles are easily mounted and removed from the hook and are held very firmly therein.

The hook of Fig. 2 may also be mounted vertically on a vertical surface for other hook uses, as may also the other hooks disclosed herein.

All of the hooks shown herein have their convolutions mounted in a single plane as will be seen in Figs. 4 and 5, the screw being axially assembled thereto thus permitting, as previously noted, of manually screwing the hook in desired position, making the use of tools unnecessary.

Another form of the invention shown in Figs. 6 and 7 comprises the slotted head screw 2—H in the slot of which is laid the straight, fulcrum forming portion 7 which may be provided with outwardly and upwardly projecting ears or bumps E adjacent to or engaging the head surface near the end of the slot, to steady the hook with respect to the screw. The ears may project horizontally or vertically or may be omitted. The fulcrum portion is curved at the forward end thereof into a resilient round end 8, this end being then bent into an elongated curved and resilient article embracing arm 9 in the interior of the hook, said arm terminating in an oppositely curved terminal seat 10 to act to embrace an article shown dotted, between said curved seat portion 10 and the lower part of the hook bent from the rear end of the portion 7 downwardly developing the resilient curve 7' and then in substantially segmentrical conformity to the described upper part to form the resilient curve 17', the elongated portion 17, the resilient curve 18, the arm 19 and the seat 20.

The hook of Fig. 8 is similar to the hook described of Figs. 6 and 7, except that the ears E are omitted and the fulcrum portion 7 may be straight or crimped to form shoulders S near or engaging the head H and the extensions L bent to lie in a substantially straight line. The elongated portion 17 is substantially straight and all other portions are similar to corresponding portions described of Figs. 6 and 7.

Having thus described the invention what is claimed is:

1. A supporting device comprising a headed screw adapted to be screwed into a support and having in its head a diametric slot of substantially rectangular cross-section, the innermost face of the slot being perpendicular to the axis of the screw; and a single piece of flat resilient wire of elongated cross-section fitted and held in said slot flat against said innermost face and bent to form opposed arms joined at one end and at the other end bent to form opposed jaws; said arms being in substantially the same plane with each other and said screw and extending remote from the axis of the screw on opposite sides thereof.

2. A suspensory device comprising a screw adapted to be vertically upwardly screwed into a shelf and having in its head an elongated diametric slot of substantially rectangular cross-section, the innermost face of the slot being substantially perpendicular to the axis of the screw; and a single piece of flat resilient wire of horizontally elongated rectangular cross-section bent to form a horizontally elongated hook comprising upper and lower arms flexibly joined at one end and at the other end bent to form opposed jaws, the upper arm being fitted and secured in said slot flat against said innermost face substantially near the mid point of the arm; the wire being bent to form within the hook an upwardly facing curved seat for the cup handle; said arms being in substantially the same vertical plane with each other and said screw and extending in opposite directions remote from the axis of the screw.

3. A suspensory device comprising a headed screw adapted to be vertically upwardly screwed into a shelf and having in its head a diametric slot of substantially rectangular cross-section, the innermost face of the slot being perpendicular to the axis of the screw; and a single piece of flat resilient wire of horizontally elongated rectangular cross-section bent to form a horizontally elongated hook comprising upper and lower arms flexibly joined at one end and at the other end bent to form opposed jaws, the upper arm being extended at its jaw and folded back to form a looped handle and superposed in contact upon itself to form a double thickness portion of rectangular cross-section fitted and secured in said slot substantially at the mid point of the arm; the wire being bent to form within the hook an upwardly facing curved seat for the cup handle, the folded back part of the wire being superposed upon the upper arm for strengthening the upper arm and said part against bending when the screw is screwed to the shelf in gimlet fashion; said wire being free of any perforation at the slot and being more than twice as wide as thick, thereby to make the jaws yieldable from each other and to make the arms stiff against movement around the axis of the screw, thereby to provide rigidity when torque is applied for screwing, in gimlet fashion, the screw into said support; the screw head at the margins of the slot being swaged over and against the wire in the slot to firmly hold the faces of the wire flat against the faces of the slot to prevent said portion from moving longitudinally or turning axially in the slot; said wire being formed with shoulder forming barriers adapted to engage the screw head to prevent the wire from being forced out of the slot longitudinally of the slot.

4. A suspensory device comprising a screw adapted to be vertically upwardly screwed into a shelf; and a single piece of thin resilient wire bent to form a horizontally elongated hook comprising upper and lower arms flexibly joined at one end of the hook and at the other end bent to form upper and lower yieldably opposed jaws, the upper arm being secured to said screw at a point intermediate of the arm; the part of said hook where the arms are joined forming an approximately vertical flexible part by which the arms are flexibly joined; said lower arm being downwardly inclined from its jaw to said part and bent to form within the hook an upwardly facing curved cup-handle seat substantially at said part; said seat being at said flexible part to decrease the moment of leverage and lessen the tendency of the weight of the cup to weaken said flexible part, to allow the use of thin wire to give yieldability at the lower jaw.

JOHN H. H. TIRYAKIAN.